2 Sheets--Sheet 2.

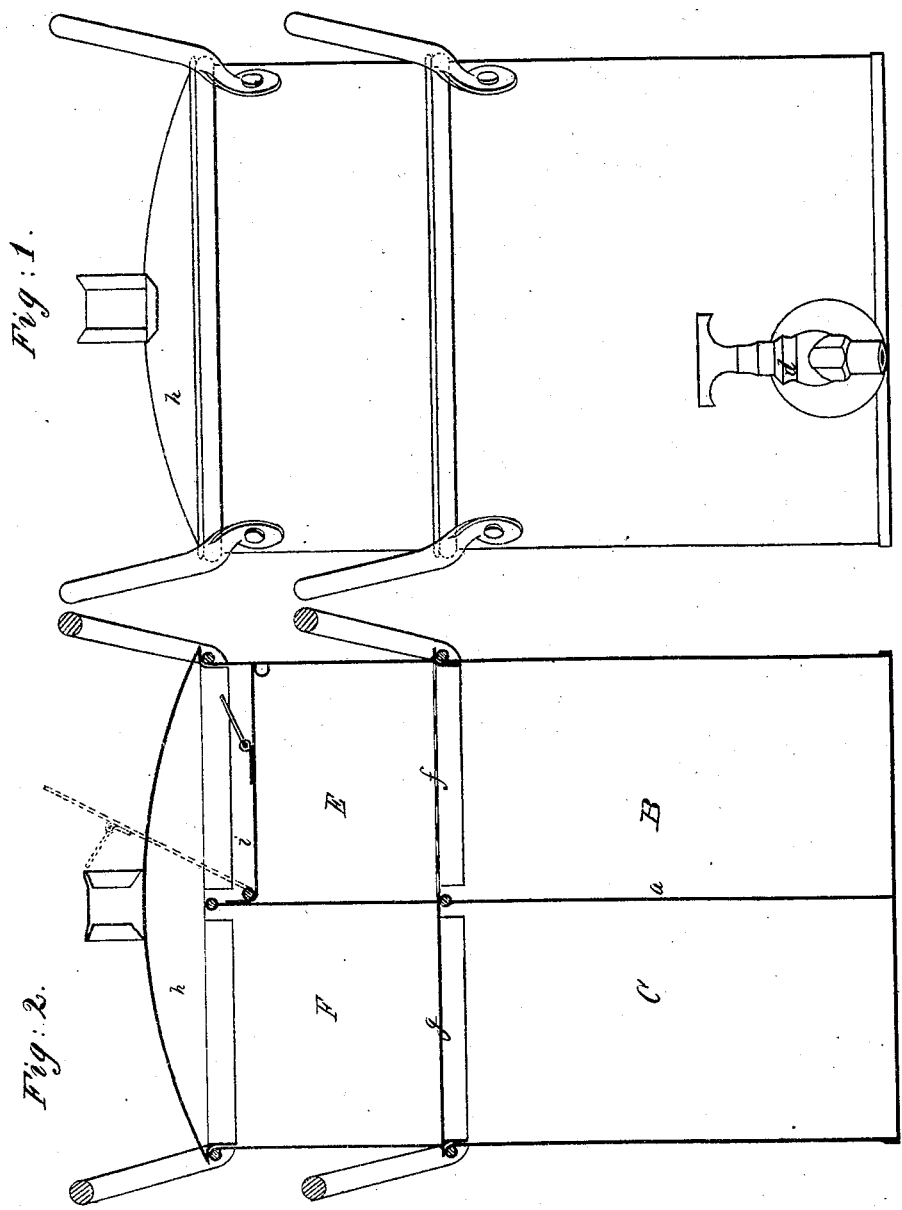

JOHN D. DURHAM.
Culinary Boiler.

No. 123,876. Patented Feb. 20, 1872.

Witnesses.
Chas H Smith
Geo. T. Pinckney

Inventor.
John D. Durham.
Lemuel W. Serrell
atty.

AM. PHOTO-LITHOGRAPHIC CO. N.Y. (OSBORNE'S PROCESS.)

123,876

UNITED STATES PATENT OFFICE.

JOHN DYKES DURHAM, OF DALSTON, ASSIGNOR TO ERNEST BRAMMER, OF LONDON, ENGLAND.

IMPROVEMENT IN CULINARY-BOILERS.

Specification forming part of Letters Patent No. 123,876, dated February 20, 1872.

*To all to whom it may concern:*

Be it known that I, JOHN DYKES DURHAM, of Dalston, in the county of Middlesex, England, have invented or discovered certain new and useful "Improvements in Cooking Apparatus;" and I do hereby declare that the following is a full and exact description thereof, reference being had to the accompanying drawing and to the letters of reference marked thereon.

These improvements refer to compound apparatus or utensils for cooking meat, poultry, vegetables, soup, and other articles of food, all at one and the same time, if desired.

Figure 4:
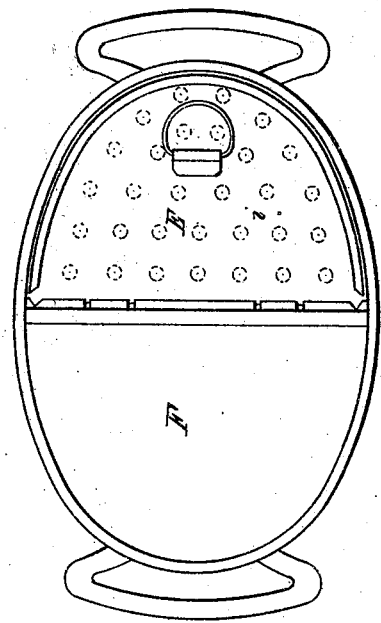
Figure 5:
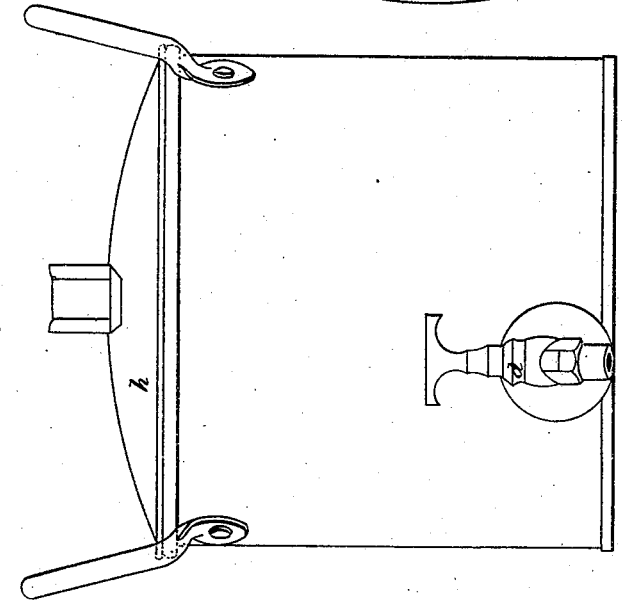

The invention will be best understood by referring to the accompanying drawing, Figure 1 being a front elevation, and Fig. 2 a vertical section through the same. Fig. 3 is a front elevation of the lower part with the lid, without the upper part; and Fig. 4 is a plan of the upper part.

The apparatus consists of a lower part, B C, and an upper part, E F, as shown. The lower part is divided into two or more hot-water compartments by means of a partition, a, two of such compartments, B and C, being shown in this case. One or more of these lower compartments are used for cooking solids, and the others or other for soup or other liquid, the latter, C, or either of them, being provided with a tap, d, at the bottom for drawing off the contents. The upper part fits on the lower part and on the partition in the same, and is itself divided into two or more compartments, two being here shown, E and F, the former having a cullender or strainer-bottom, f, with hinged lid at top, and the latter a solid bottom, g; the compartment E being intended for cooking potatoes by the steam rising from the hot-water compartment B underneath, and the compartment F for cooking green vegetables. The lids h and i close the top of the upper chambers. When this upper part is not required, it can be removed and replaced by the lid h, which also fits onto the lower part of the cooking apparatus, as shown at Fig. 3. Both the upper and the lower part and the lid are provided with suitable handles, as shown.

Apparatus constructed according to this invention are particularly suitable for large families, hospitals, and camps.

I claim as my invention—

The upper removable vessel E F, provided with the bottoms f g and lid h, in combination with the lower vessel C B, substantially as and for the purposes set forth.

JOHN DYKES DURHAM.

Witnesses:
E. PLANTA,
EDWD. GRIFFITH BREWER.